HIGH FREQUENCY MAGNETIC READOUT HEAD

Filed Nov. 13, 1962 2 Sheets-Sheet 1

INVENTOR.
RICHARD E. MORLEY
BY
Philip J. McFarland
ATTORNEY

Nov. 22, 1966 R. E. MORLEY 3,287,504

HIGH FREQUENCY MAGNETIC READOUT HEAD

Filed Nov. 13, 1962 2 Sheets-Sheet 2

INVENTOR.
RICHARD E. MORLEY
BY
Philip J. McFarland
ATTORNEY

United States Patent Office 3,287,504
Patented Nov. 22, 1966

3,287,504

HIGH FREQUENCY MAGNETIC READOUT HEAD

Richard E. Morley, Bedford, Mass., assignor to Laboratory for Electronics, Inc., Boston, Mass., a corporation of Delaware Filed Nov. 13, 1962, Ser. No. 236,915
1 Claim. (Cl. 179—100.2)

This invention pertains generally to magnetic transducers and particularly to apparatus of such type in which special provisions are made to minimize the effect of unwanted signals in order to increase the signal-to-noise ratio of the output of the transducer when it is used to read recorded signals.

When a magnetic storage device, as a drum or a rotating disc in combination with one or more magnetic transducers, is used as a recirculating register or as a delay line for pulsed signals it is extremely important that the effect of unwanted signals (which result in degradation of the shape of the individual pulses and a decrease in signal-to-noise ratio) be minimized. The problem is especially acute when, at the same time, it is necessary to process closely packed pulse signals. That is, when the density of the pulses being processed is in the order of, say, 200 pulses (or bits) per inch on the recording surface extreme care must be taken if faithful reproduction is to be attained.

It is known that proper shielding of magnetic transducers from stray magnetic fields, as those surrounding electric motors, transformers and the like, improves the performance of such transducers. It is also known that shielding may be used to minimize interaction, or "cross-talk," between adjacent magnetic transducers. In other words, it is known that means for shielding a magnetic transducer are, along with the means for positioning the transducer with respect to the recording medium during the writing and reading process, highly desirable if a high density recording process is to be accomplished satisfactorily.

It is also known that the response of a magnetic transducer to high frequency components of an electric pulse is greatly accentuated if the size of its gap and the spacing thereof from the recording medium is small. Therefore, it has become standard practice in the art to use a magnetic transducer with an extremely small gap closely spaced from the recording medium when pulses containing high frequency components are to be processed. Even if the cost of such transducers is disregarded, however, gap size and spacing may be reduced only to a certain degree in any practical case. Consequently, usefulness of that particular technique is limited, especially when the transducer is to be used as a "reading" head.

Therefore, it is an object of this invention to provide an improved magnetic transducer particularly well adapted to reading high frequency signals.

Another object of the invention is to provide an improved magnetic transducer which is adapted to the rejection of all frequencies below a predetermined cutoff frequency.

Another object of the invention is to provide an improved magnetic transducer which is relatively insensitive to the effect of stray magnetic fields.

Still another object of the present invention is to provide an improved magnetic transducer which accomplishes the foregoing objects simply and at relatively low cost.

These and other objects of the invention are attained generally by a magnetic transducer having two separate opposing magnetic paths to which the recorded signals on a recording medium may be coupled (the first of such paths being responsive to substantially all the frequency components in the recorded signal and the second of such paths being responsive only to the frequency components in the recorded signal below a selected cutoff frequency) and at least one coil coupled to the magnetic paths so that its electrical output is proportional to the difference beween the flux in the two magnetic paths.

For a more complete understanding of the invention, reference is now made to the detailed description of different embodiments of the invention illustrated in the drawings, in which.

Figure 1:
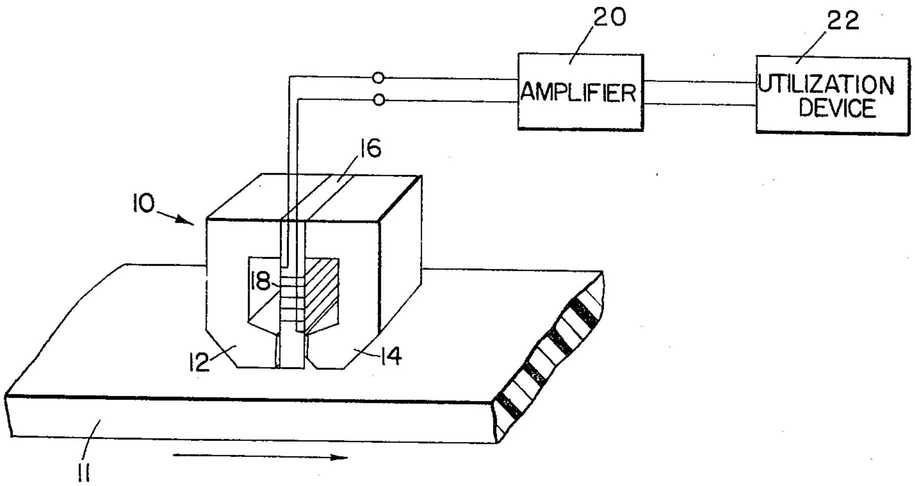
FIG. 1 is a greatly simplified view of the essential portions of a magnetic transducer which is particularly well adapted to discrimination of high frequency signals.

Before any detailed explanation of the various figures is undertaken, it would be well to point out that the many simplifications in the drawings involve only details which any person of skill in the art would automatically include in a working model of a magnetic transducer. Thus, details such as the casing in which the transducer would be mounted and hardware such as terminals, etc., have not been shown. Further, it should be pointed out that, although the recording medium has been shown as a tape, any other form of recording medium could be used. That is, the recording medium could just as well be in the form of a disc or a drum without departing from the concept of the invention.

Referring now to FIG. 1, it may be seen that a magnetic transducer 10 according to a first embodiment of the invention consists of a first pole piece 12 and a second pole piece 14 disposed on either side of a common leg piece 16 upon which is wound a coil 18. The ends of the coil 18 are connected through terminals to any desired external circuitry, as an amplifier 20 and a utilization device 22.

Figure 2:
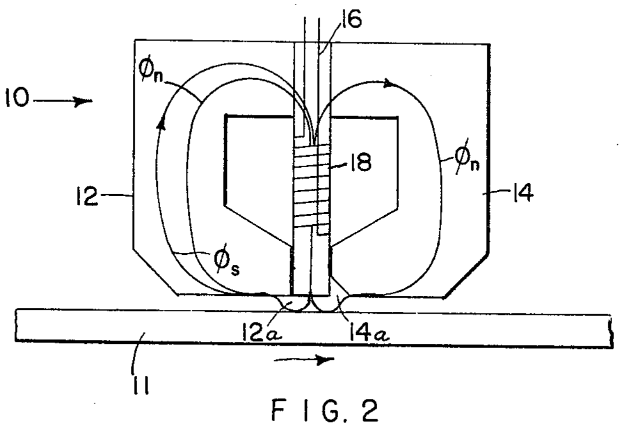
FIG. 2 is a schematic drawing illustrating the manner in which magnetic flux flows through the transducer illustrated in FIG. 1 to accomplish the desired result; and, FIG. 3 is a greatly simplified view of a magnetic transducer according to a second embodiment of the invention in combination with a conventional magnetic transducer.

The first and second pole pieces 12, 14 and the common leg piece 16 are, of course, fabricated from a paramagnetic material, as sintered ferrite, according to well known methods. Gaps 12*a*, and 14*a* are formed as shown. As may be seen in both FIG. 1 and FIG. 2 there is a substantial difference between the shape of the first pole piece 12 and the shape of the second pole piece 14 so that the shape of the gaps 12*a*, 14*a* are different. Thus, the lower end of the first pole piece 12 is square with the bottom of the common leg piece 16 while the lower end of the second pole piece 14 is beveled adjacent to the common leg piece 16. Since the average gap distance (meaning the distance from the recording medium 11 and the adjacent working portions of the magnetic transducer 10 is greater at gap 14*a* than at 12*a*, the frequency response of the former is less than the frequency response of the latter. In other words, gap 14*a* is less responsive than gap 12*a* to high frequency components of any recorded signal. If a recorded signal having frequency components which give rise to magnetic flux such as represented in FIG. 2 by the lines labelled $46_s$ and $46_n$, (where $46_s$ represents flux change at a frequency above the cutoff frequency of gap 14*a* and $46_n$ represents flux change at a frequency below such cutoff frequency) only the flux $46_n$ will be linked to both magnetic circuits. Since, however, the flux $46_n$ in the pole pieces 12, 14 is self cancelling in the common leg piece 16, only the flux $46_s$ will be effective in inducing a voltage in the coil 18. It follows then that the lower frequency components of the recorded signal are not present in the signal output of the coil 18.

While is it recognized that, since the gaps 12a, 14a of the just described transducer sample different parts of the magnetic recording medium, complete cancellation of unwanted components of the recorded signal would not be attained, it has been found that, with respect to noise (including randomly recorded signals not carrying information), the cancellation is usually quite satisfactory. When, however, it is necessary that the sampling of the recorded signal be accomplished at the same point on the recording medium, the structure shown in FIG. 3 may be utilized.

Figure 3:
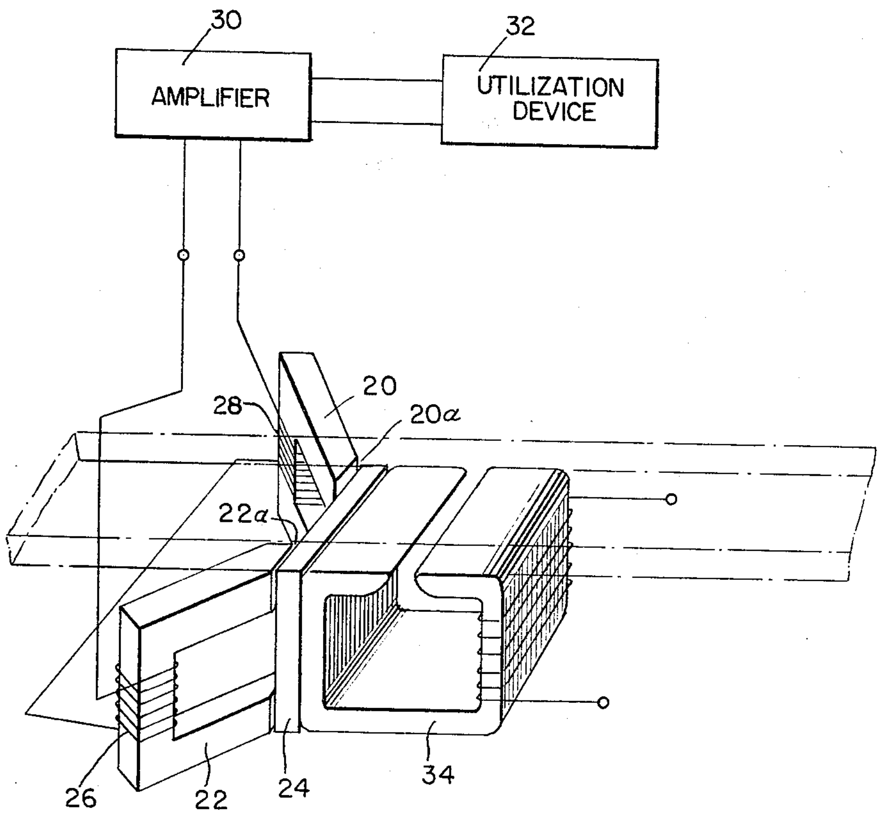

Turning now to FIG. 3 it may be seen that a reading transducer according to the invention may consist of a first and a second U-shaped core 20, 22 disposed adjacent to a magnetic shorting piece 24 so that gaps 20*a* 22*a* (each of different length) are formed. Coils 26, 28 are supported on the respective cores 20, 22, the windings of the cores 26, 28 being connected in series opposition as shown. The free ends of the windings are then connected through an amplifier 30 to a utilization device 32. The writing head 34, which may be conventional except for the fact that its gap must be elongated as shown to span both gaps 20*a*, 22*a*, completes the system.

When the writing head 34 is energized by any conventional means (not shown), the signal impressed on the writing head 34 is recorded on the recording medium (shown in phantom). If then the recording medium is moved by any conventional means (not shown) past the gaps 20*a*, 22*a*, flux is coupled through the cores 20, 22 to induce voltages in the coils 26, 28. As in the case of the structure illustrated in FIG. 1, flux due to the higher frequency components of any recorded signal will not couple equally to both cores 20, 22. Further, since the windings of the coils 26, 28 are in series opposition, the voltage input to the amplifier 30 will be the difference in the voltages induced in the coils 26, 28. That is, only the high frequency components of the recorded signal are reproduced by the reading head just described.

It will become immediately apparent to those skilled in the art that the structure just described will attain all the stated objects of the invention and that there are modifications to the structure which may be made without departing from the spirit of the invention. For example, it is quite evident that the recording technique shown in FIG. 3 may be used with the reading head shown in FIG. 1 to permit rotation of that head 90° so that sampling of the same point on the recorded signal is done by both gaps simultaneously. It is also evident that the configuration of the gaps and the shape of the magnetic cores may be changed to suit particular design situations. Further, since stray magnetic fields from electrical equipment are ordinarily of low frequency, the disclosed transducers effectively prevent such fields from effecting the shape of the output signal of the transducers. It is felt, therefore, that the invention should not be restricted to its particular disclosed embodiments but rather should be limited only by the spirit and scope of the appended claim.

What is claimed is:

A magnetic record transducer comprising:

(a) a magnetic core including first and second circuits formed with a common leg and a pair of confronting pole pieces defining a first and a second magnetic gap in the magnetic circuits adjacent the common leg, the width of the first magnetic gap differing from width of the second magnetic gap; and (b) a coil disposed about the common leg of said core, said core being disposed to link said circuits with flux from a recorded signal such that the flux in said first circuit induces a voltage in said coil of opposite sense to that induced by the flux in said second circuit, thereby suppressing the lower frequency components of said voltage which are induced by the flux in both circuits and emphasizing the higher frequency components of said voltage which are induced only by the flux in the circuit with the narrower gap.

References Cited by the Examiner

UNITED STATES PATENTS

| | | | |
|---|---|---|---|
| 2,540,711 | 2/1951 | Cameras | 179—100.2 |
| 2,885,488 | 5/1959 | Andrews | 340—174.1 |

JAMES W. MOFFITT, *Acting Primary Examiner.*

A. I. NEUSTADT, *Assistant Examiner.*

UNITED STATES PATENT OFFICE

CERTIFICATE OF CORRECTION

Patent No. 3,287,504 November 22, 1966

Richard E. Morley

It is hereby certified that error appears in the above numbered patent requiring correction and that the said Letters Patent should read as corrected below.

Column 2, line 59, for "$46_s$", each occurrence, read -- $\emptyset_s$ --; same line 59, for "$46_n$" read -- $\emptyset_n$ --; lines 61, 63 and 64, for "$46_n$", each occurrence, read -- $\emptyset_n$ --; line 65, for "$46_s$ read -- $\emptyset_s$ --.

Signed and sealed this 12th day of September 1967.

(SEAL)
Attest:

ERNEST W. SWIDER
Attesting Officer

EDWARD J. BRENNER
Commissioner of Patents